(12) United States Patent
Emerson et al.

(10) Patent No.: US 8,428,242 B2
(45) Date of Patent: Apr. 23, 2013

(54) SYSTEM AND METHOD FOR HOLD AND RE-RING

(75) Inventors: David Emerson, Overland Park, KS (US); David E. Rondeau, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1237 days.

(21) Appl. No.: 12/004,804

(22) Filed: Dec. 20, 2007

(65) Prior Publication Data

US 2009/0161855 A1 Jun. 25, 2009

(51) Int. Cl.
*H04M 3/42* (2006.01)

(52) U.S. Cl.
USPC ............ 379/212.01; 379/201.01; 379/207.11; 379/211.01; 379/211.04

(58) Field of Classification Search .................. 455/415, 455/519; 370/352, 259, 389; 379/311.02, 379/211.04, 212.01, 211.01, 211.03, 209.01, 379/207.09, 207.11, 207.04, 207.08, 201.01
See application file for complete search history.

(56) References Cited

U.S. PATENT DOCUMENTS

| | | | |
|---|---|---|---|
| 5,559,859 A | 9/1996 | Dai et al. | |
| 5,619,556 A | 4/1997 | Richardson et al. | |
| 6,363,248 B1 | 3/2002 | Silverman | |
| 6,584,316 B1 | 6/2003 | Akhteruzzaman et al. | |
| 6,853,718 B1 | 2/2005 | Bedingfield et al. | |
| 6,856,806 B1 | 2/2005 | Bosik et al. | |
| 6,975,874 B1 | 12/2005 | Bates et al. | |
| 6,999,757 B2 | 2/2006 | Bates et al. | |
| 7,082,192 B2 | 7/2006 | Weaver | |
| 7,103,366 B2 | 9/2006 | Bates et al. | |
| 7,130,643 B2 | 10/2006 | Bates et al. | |
| 7,251,494 B2 | 7/2007 | Bates et al. | |
| 7,443,972 B1 | 10/2008 | Barlow et al. | |
| 7,965,829 B2 | 6/2011 | Crockett et al. | |
| 2004/0170268 A1* | 9/2004 | Hakusui | 379/211.02 |
| 2004/0234056 A1 | 11/2004 | Heilmann et al. | |
| 2005/0096023 A1* | 5/2005 | Moore | 455/415 |
| 2006/0077957 A1* | 4/2006 | Reddy et al. | 370/352 |
| 2006/0252444 A1* | 11/2006 | Ozugur | 455/519 |
| 2007/0041550 A1* | 2/2007 | McLarty et al. | 379/211.02 |
| 2007/0154005 A1* | 7/2007 | Daigle | 379/211.04 |
| 2008/0064375 A1 | 3/2008 | Gottlieb | |
| 2008/0081638 A1 | 4/2008 | Boland et al. | |
| 2008/0192655 A1* | 8/2008 | Vagelos | 370/259 |
| 2008/0259918 A1* | 10/2008 | Walker et al. | 370/389 |
| 2008/0317234 A1* | 12/2008 | Di Fabbrizio et al. | 379/211.01 |
| 2009/0268895 A1 | 10/2009 | Emerson et al. | |
| 2009/0323919 A1 | 12/2009 | Toner et al. | |
| 2010/0009665 A1 | 1/2010 | Hawkins et al. | |
| 2010/0240343 A1 | 9/2010 | Russell | |

OTHER PUBLICATIONS

U.S. Appl. No. 12/107,892; Final Rejection dated Aug. 18, 2012; 19 pages.
U.S. Appl. No. 12/107,892; Non-Final Rejection dated Mar. 29, 2012; 16 pages.

(Continued)

*Primary Examiner* — Thjuan K Addy
(74) *Attorney, Agent, or Firm* — Swanson & Bratschun, L.L.C.

(57) ABSTRACT

A system and method for transferring calls. A voice communication is received. The voice communication is placed on hold in response to receiving user input. Multiple phones are rung simultaneously in response to receiving the user input. The voice communication is connected to one of the multiple phones in response to a user answering the voice communication on one of the multiple phones.

20 Claims, 7 Drawing Sheets

OTHER PUBLICATIONS

U.S. Appl. No. 12/172,772; Final Office Action dated Mar. 12, 2012; 13 pages.
U.S. Appl. No. 12/172,772; Non-Final Office Action dated Mar. 31, 2011; 12 pages.
U.S. Appl. No. 12/146,118; Notice of Allowance dated Jan. 9, 2012; 7 pages.
U.S. Appl. No. 12/146,118; Non-Final Rejection dated Sep. 14, 2011; 6 pages.
U.S. Appl. No. 12/107,892; Notice of Panel Decision from Pre-Appeal Brief dated Dec. 14, 2012; 2 pages.
U.S. Appl. No. 12/107,892; Non-Final Rejection dated Dec. 21, 2012; 13 pages.

* cited by examiner

FIG. 7

| | Graphical User Interface | 700 |

- ✓ Edit Access List  708
  - Numbers ▼
- 710 Command Code  #99

702 Username  Dswen
704 Password  ********
706 Customer/Company ID  24548

Notification Preferences
712
- ✓ Delayed Calling  5 second delay
- ☐ Incremental transfer
- ☐ Email Alerts

| 714 Category | 716 Number | 718 Name |
|---|---|---|
| Work | 1-214-997-9997 | Bob McKenzie - VoIP |
| Cell | 1-469-999-9999 | B. McKenzie - mobile |
| PDA | 1-214-999-9999 | Blackberry |

SYSTEM AND METHOD FOR HOLD AND RE-RING

BACKGROUND

The use and development of communications has grown nearly exponentially in recent years. The growth is fueled by larger networks with more reliable protocols and better communications hardware available to service providers and consumers. Users have similarly grown to expect better communications from home, work, and on the go. In many cases, users continue or canyon conversations across multiple devices.

In some cases, a user may utilize a call transfer feature to transfer a phone call to another telephone. Many of these systems and features may transfer a phone call to only a single specified number. For example, the user may be required to enter a password and a phone number to transfer the call. The requirements of such call forwarding systems necessitate more time and effort to transfer the call than would be preferred by most users. As a result, many callers may hang up or be disconnected from a user during a conversation. A simplified form of communication across telephones may be beneficial to many users.

SUMMARY

One embodiment includes a system and method for transferring calls. A voice communication may be received. The voice communication may be placed on hold in response to receiving user input. Multiple phones may be rung simultaneously in response to receiving the user input. The voice communication may be connected to one of the multiple phones in response to a user answering the voice communication on one of the multiple phones.

Another embodiment includes a communication system. The communication system may include a switch configured to receive a voice communication. The switch may include a transfer unit configured to place the voice communication on hold in response to receiving a transfer command, ring a plurality of phones simultaneously in response to receiving the transfer command, and connect the voice communication to one of the plurality of phones in response to a user answering the voice communication on the one of the plurality of phones.

Yet another embodiment includes a call transfer system. The system may include a processor for executing a set of instructions and a memory for storing the set of instructions. The set of instructions may be configured to receive a voice communication, place the voice communication on hold in response to receiving user input, ring a plurality of phones simultaneously in response to receiving the user input, and connect the voice communication to one of the plurality of phones in response to a user answering the voice communication on the one of the plurality of phones.

BRIEF DESCRIPTION OF THE DRAWINGS

Illustrative embodiments of the present invention are described in detail below with reference to the attached drawing figures, which are incorporated by reference herein and wherein:

FIG. 7 is a pictorial representation of a graphical user interface in accordance with an illustrative embodiment.

DETAILED DESCRIPTION OF THE DRAWINGS

Illustrative embodiments provide a system and method for transferring voice communications. In one embodiment, a user may receive a voice communication on a first device. The voice communication may be any form of verbal communications and is referred to as a phone call or call for purposes of describing the illustrative embodiments. The phone call may be received on a first telephonic device, herein referred to as a telephone or phone. At some point during the phone call, the user may desire to change locations or otherwise transfer the phone call to a different telephone. The user may provide user input by dialing a single key sequence or providing other input to temporarily place the call on hold. A number of other telephones may then ring simultaneously until one of the telephones is answered by the user. The user is not required to specify the phone to which the phone call is transferred.

The user may also send text or email messages when the call is placed on hold to ring other telephones. The message may indicate the call transfer feature is being utilized and provide instructions or information regarding whether or not to answer the phone, where the phone call is transferred from and to, and whom performed the call transfer. The call transfer feature may be configured to only ring the telephones a specified number of times before canceling the ringing, and re-ringing of the telephones to prevent an answering machine, or other voicemail feature or service from connecting to the call.

The illustrative embodiments may allow a user to easily transfer calls between a wireless and wire line connection. Call transfers may be especially useful because of limited wireless minutes, privacy, available services, and quality of service concerns. As a result, a user may be able to hold a call and then ring a number of telephones using a single command to transfer the call without ending the call.

Figure 1:
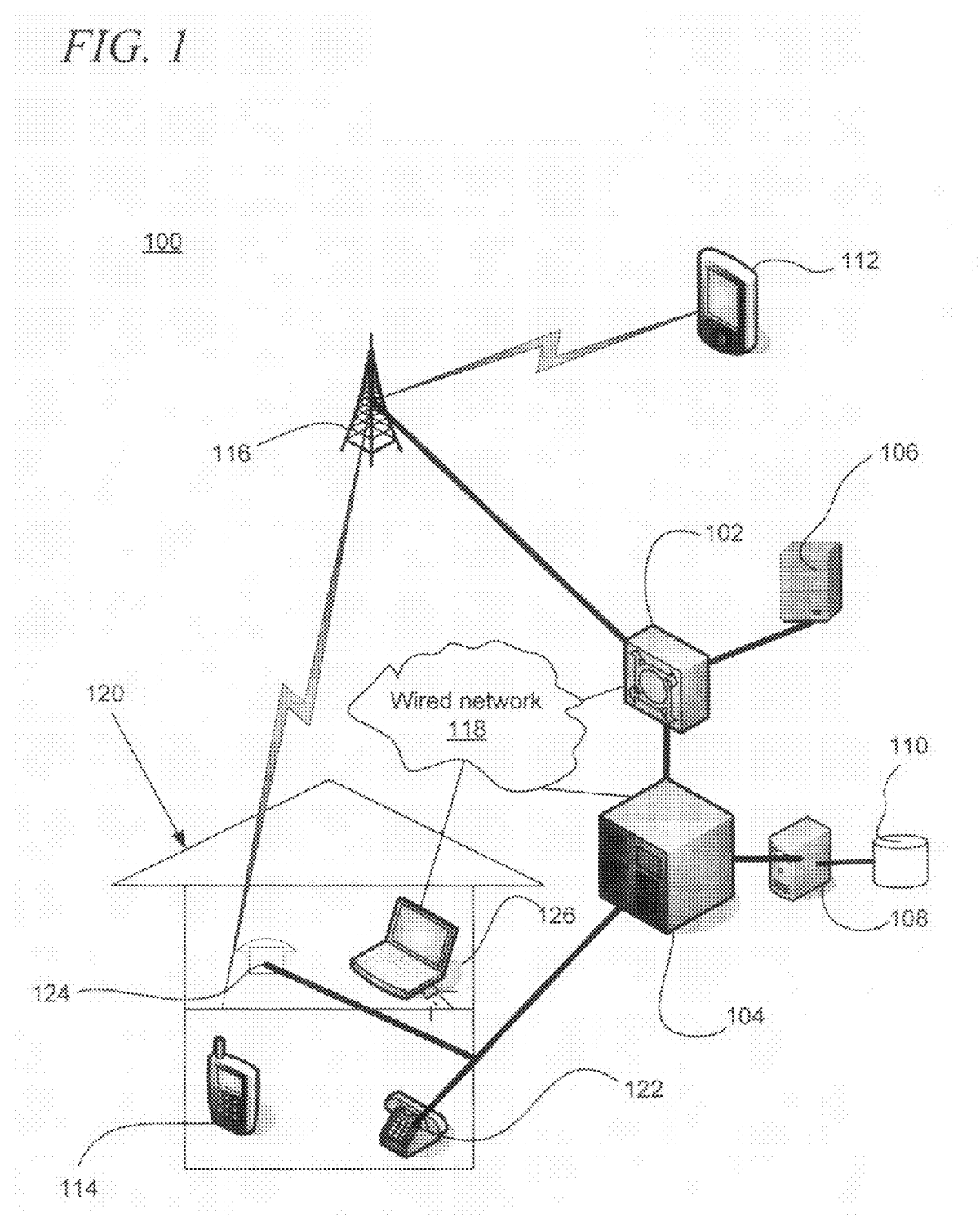
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. The communications system 100 includes a mobile switching center 102, a local exchange 104, voicemail systems 106 and 108, a database 110, wireless devices 112 and 114, a transmission tower 116, a wired network 118, a home 120, home telephones 122 and 124, and a client 126. In one embodiment, the different elements and components of the communications system 100 communicate using wireless communications including satellite connections or hardwired connections, such as fiber optics, T1, cable, DSL, high-speed trunks, and telephone lines.

The wireless devices 112 and 114 may communicate with the transmission tower 116 using communications protocols, such as time division multiple access (IDMA), code division multiple access (CDMA), global systems for mobile (GSM) communications, personal communications systems (PCS), WLAN, WiMAX, or other frequently-used cellular and data communications protocols and standards. The wireless devices 112 and 114 may include cellular phones, Blackberry®, personal digital assistants (PDA), laptops, evolution data optimized (EDO) cards, multi-mode devices, and other wireless communication devices and elements.

Communications within the communications system 100 may occur on any number of networks which may include wireless networks, data or packet networks, private networks, publicly-switched telephone networks (PSTN), and the wired network 118. The networks of the communications system 100 may represent a single communication service provider or multiple communications services providers. The features of the embodiments may be implemented by one or more elements of the communications system 100 independently or as a networked implementation.

In one embodiment, the mobile switching center (MSC) 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described.

The MSC 102 may be a switch used for wireless call control and processing. The MSC 102 may also serve as a point of access to the local exchange 104. The MSC 102 is a telephone exchange that provides circuit-switched calling and mobility management and may also provide GSM or PCS services to the wireless devices 112 and 114 located within the area the MSC 102 serves. The MSC 102 may include one or more home locator record (HLR) and virtual locator record (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information and data. In another embodiment, the voicemail system 106, a server, or other intelligent network device may store user preferences and implement the call transferring, as further described herein. The user may interact or send and receive data, information, and commands through the telephones 122 and 124, wireless device 112 and 114, or the client 126. In particular, a hold and re-ring command may be entered using the telephones 122 and 124, wireless device 112 and 114, or the client 126 to simultaneously ring a number of pre-selected devices to be answered by the user. The MSC 102 and voicemail system 106 may include any number of hardware and software components. In one embodiment, the MSC 106 is an advanced intelligence network device with software modules equipped to perform call transferring features and functions.

The local exchange 104 and MSC 102 communicate using a signal control protocol, such as a signaling system number 7 (SS7) protocol. The SS7 protocol is used in publicly-switched networks for establishing connections between switches, performing out-of-band signaling in support of the call-establishment, billing, routing, and implementing information-exchange functions of the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network VoIP works by sending voice information in digital form in packets, rather than in the traditional circuit-committed protocols of the publicly-switched network.

The communications system 100 may further include any number of hardware and software elements that may not be shown in the example of FIG. 1. For example, in order to facilitate VoIP communications, the communications system and the MSC 102 and local exchange 104, in particular, may include application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other components of a wire line network, such as a data, PSTN, VoIP, or other wired network may implement the call transferring features and perform the methods herein described.

The MSC 102 and the local exchange 104 may include an authentication space. The authentication space may be a partition of the server or other storage designated by the communications service provider. The authentication space may validate that a user or device, such as client 126, is allowed to authorize the MSC 102, local exchange 104, or corresponding voicemail system 106 and 108 to set preferences, implement changes, review information, or perform other updates. For example, a user may be first required to provide a secure identifier, such as a user name, password, or other authentication code or hardware interface, to verify that the user is authorized to make changes within the authentication space.

The authentication information may be used to create a secure connection between the client 126 and the MSC 102 or the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may utilize a host client application to communicate with numerous clients.

The home 120 is an example of a dwelling or residence of a person or group that may use any number of communications services. The home 120 is shown as a residence in the illustrated example; however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator. In another embodiment, the home telephone 124 may be integrated with a personal computer, such as client 126. The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications.

The client 126 may be a personal computer for performing and executing programs and instructions and accessing the wired network 118. However, the client 126 may be any computing devices suitable for communicating with the wired network 118. The wired network 118 may be a fiber optic, cable, or telephone network or other wired network suitable for communication over a hard-wired connection with the client 126. In one embodiment, the home 120 may include a wireless router, adapter, switch, hub, or other suitable interface that allows the client 126 to communicate with the wired network 118. The MSC 102 and local exchange 104 may use a graphical user interface (GUI), such as a website or program accessible from the client 126 in order to enter and receive input preferences for a preferred caller list or other preferences applicable to call transferring.

In an illustrative embodiment, the user may stipulate identifiers, such as telephone numbers, session initiation protocol (SIP) addresses, or IP addresses, for telephones on an access list, provide user input, or receive a call or communicate using devices, such as wireless devices 112 and 114, home telephones 122 and 124, and client 126. At any time, a user may select to enable, order, initiate, configure, reconfigure or otherwise establish call transferring and communications parameters as herein described.

The user may place a phone call on hold and re-ring devices listed on the access list in a number of ways. For example, the user may use a command that informs a function trigger of a device or the device itself, such as the MSC 102, local exchange 104, voicemail systems 105 and 106, wireless device 112 and 114, home telephones 122 and 124, or client 126, to ring all of the applicable devices according to user preferences. In one example, the user may submit a command to hold the phone call and re-ring the selected devices by dialing *99 on the home telephone 122. The command may also be a password, voice activated, time activated, preset by user selection or any other suitable option, setting, command, or user input. In one embodiment, the user may have established multiple access lists for ringing different configurations of numbers or devices using separate commands.

Figure 2:
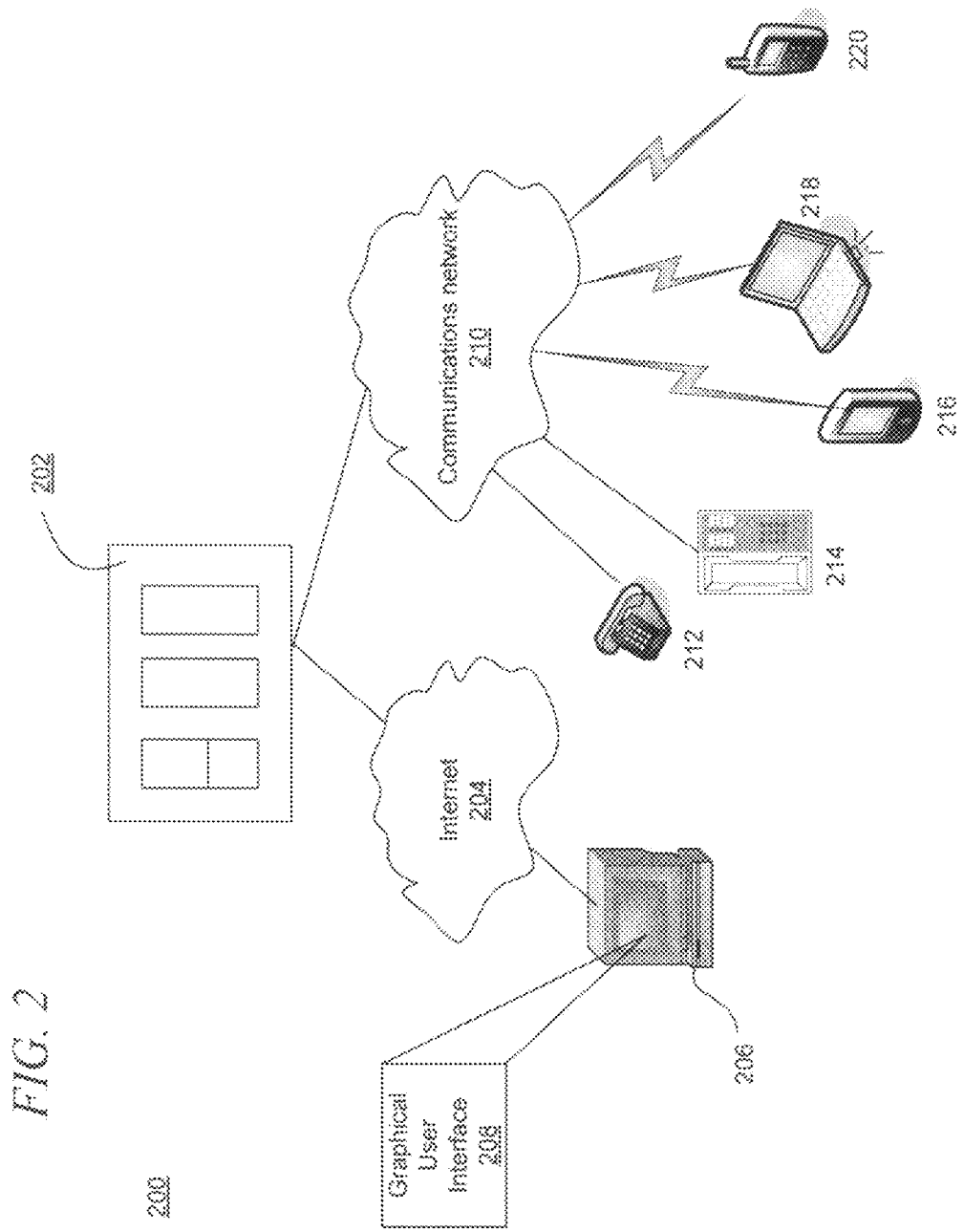
FIG. 2 is a pictorial representation of a wireless management system in accordance with an illustrative embodiment.

FIG. 2 is a pictorial representation of a communications management system in accordance with an illustrative embodiment. The communications management system 200 of FIG. 2 includes a communications management server 202, Internet 204, a remote client 206, a graphical user interface (GUI) 208, a communications network 210, and telephones 212, 214, 216, 218 and 220.

The communications management server 202 may be a single component or multiple interconnected devices as shown in the embodiment of FIG. 2. The communications management server 202 may include multiple servers, switches, intelligent network devices, computing devices, components, and corresponding software for performing the functions of a MSC, wireless access network VoIP server, switching network local exchange, class 5 switch, and/or wireless public exchange. The communications management server 202 may include an authentication space. The authentication space is a server or partition of a server designated for access by one or more users. The communications management system 200 may communicate with any number of remote clients through the Internet 204.

The communications management server 202 may perform configuration and changes for the communications network 210 and devices in communication with the communications network 210, such as telephones 212, 214, 216, 218, and 220. For example, the telephones 212, 214, 216, 218, and 220 may request services, features, files, or other elements from the communications management server 202 through the communications network 210. As described, the user may implement the call transfer feature from any one of the telephones 212, 214, 216, 218, and 220 and a call may be placed on hold and a number of the telephones 212, 214, 216, 218, and 220 may be rung with the call in response to a single user command. As used herein, a person or device that communicates with a user or receiving party is generically referred to as a calling party or caller. The communications management server 202 may act as a gateway, proxy, Centrex, or interface into the communications systems. In particular, the communications network 210 may transmit and receive wireless, digital, analog, or other communications signals to the telephones 212, 214, 216, 218, and 220. The communications network 210 may use any number of broadcast transceivers, switches, hubs, routers, communications lines, and servers in addition to the communications management server 202 to send and receive communications.

The telephones 212, 214, 216, 218, and 220 may be any type of wireless devices including cellular phones, a Blackberry®, personal digital assistants (IDA), laptops, evolution data optimized (EDO) cards, multi-mode devices, VoIP devices, plain old telephone service (POTS) devices, and other telephonic communications elements or devices. The communications network 210 may use any number of wireless communication formats including, but not limited to, code division multiple access (CDMA), global system for mobile (GSM) communications, time domain multiple access (TDMA), WiFi and WiMAX. The communications management server 202 specifies how and when the telephones 212, 214, 216, 218, and 220 communicate with other devices and other communications networks, publicly-switched networks, data networks, such as the Internet, and other public and private communications networks that interact with the communications network 210.

The communications management server 202, the communications network 210, and the remote client 210 may communicate using a wired or wireless connection. For example, the remote client 206 may be connected to the communications management server 202 by a fiber optic connection, T1, cable, DSL, satellite, high-speed trunk, or wireless connection. The communications management server 202 and the remote client 206 may communicate using any number of communications protocols. In one embodiment, the communication is a common channel signaling system 7 (SS7). SS7 refers to the exchange of information between communications components required to provide and maintain service. The communications may also be based on transmission control protocol (TCP) and Internet protocol (IP) standards.

The remote client 206 and components of the communications management server 202 may be an advanced intelligence network (AIN) device. AIN devices allow the communications management server 202 and remote client 206 to quickly and economically create and modify telecommunication services provided through the communications network 210 for the users. For example, the communications management server 202 may update an access list and user preferences for transferring calls based on information received from the remote client 206. The communications management server 202 may be operated by a wireless service provider or other communications service provider. The communications management server 202 may send control signals to ring a specified group of the telephones 212, 214, 216, 218, and 220 in response to receiving a call transfer command. The control signals may indicate a call is pending and may pass through any number of wireless and hard wired network devices, elements, and connections.

A user may access the graphical user interface 208 in order to manage the access list, associations, and notification preferences for one or more of the telephones 212, 214, 216, 218, and 220. A user may be required to first provide a secure identifier, such as a user name, password, or other authentication code or hardware interface that verifies that the user is authorized to make ringtone changes for the specified telephones 212, 214, 216, 218, and 220. This authentication information may be used to create a secured or unsecured connection between the remote client 206 and the communications management server 202. The secure connection may be a virtual private network tunnel, an encrypted connection, firewall, or other form of secured communications link.

Once connected, the user may use the options, screens, and modules of the graphical user interface 208 to configure and customize the access list, create, edit or modify notification preferences, and perform other tasks allowed within the authentication space. The authentication space of the server 218 is configured so that the remote client 206 may make changes only to telephones 212, 214, 216, 218, and 220 controlled by the authentication space 224. The remote client 206 may be any interconnected devices configured to display a graphical user interface, such as a desktop computer, terminal of a shared computer system, wirelessly connected cell phone, wirelessly connected PDA, data connected home telephone devices or a data connected television set. In one embodiment, the graphical user interface is a web page interface provided by the communications management server 202. The telephones 212, 214, 216, 218, and 220 may be alternatively connected to the remote client 206 using an electronic interface to identify, register, and configure the wireless device.

Figure 3:
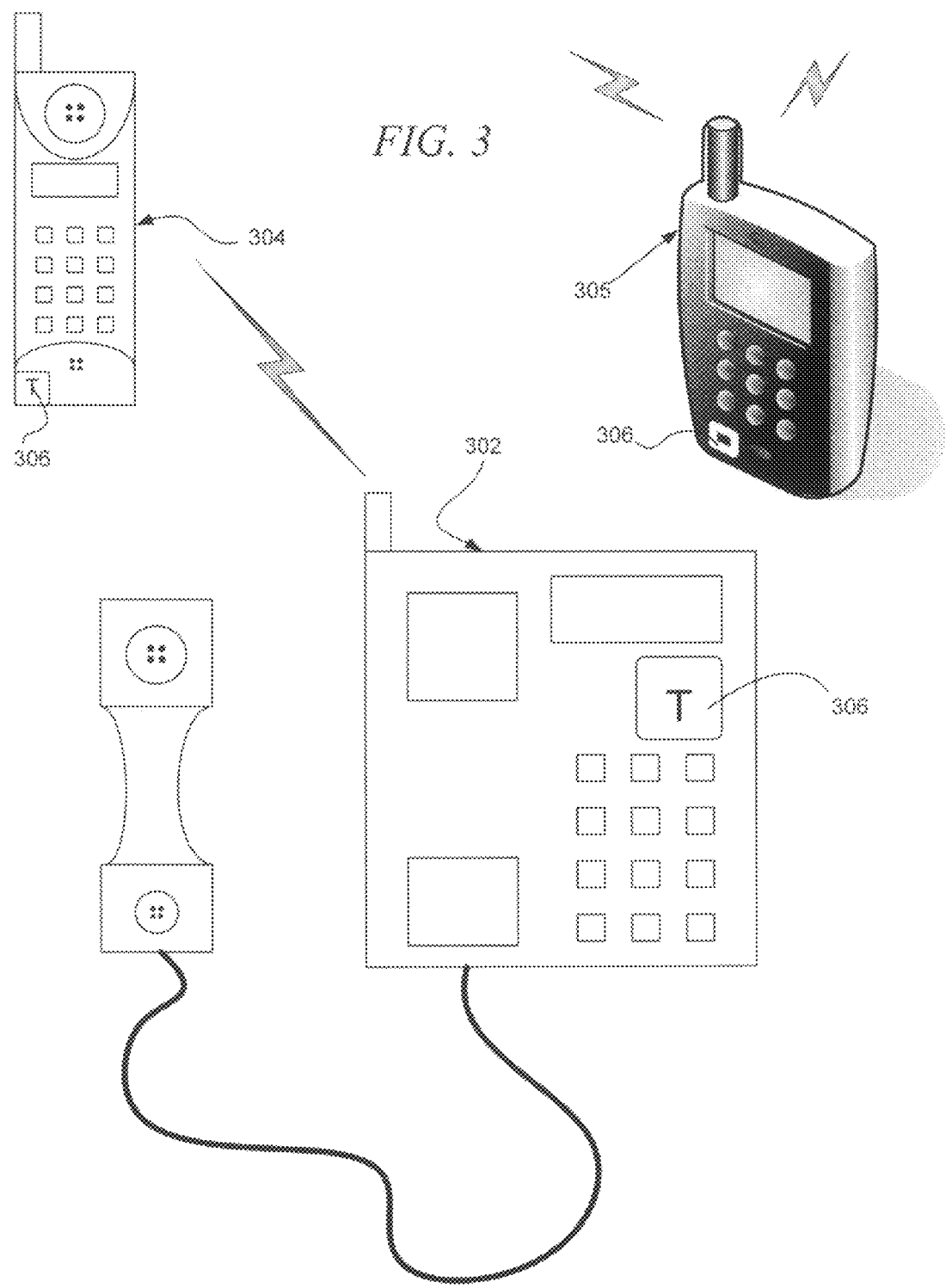
FIG. 3 shows examples of communications devices in accordance with an illustrative embodiment.

FIG. 3 shows examples of communications devices in accordance with illustrative embodiments. FIG. 3 includes a standard telephone 302, a cordless telephone 304, and a wireless device 305. The standard telephone 302, the cordless telephone 304, and wireless device 305 may include a transfer button 306. The standard telephone 302 and cordless telephone 304 are particular implementations of the standard telephone 122 of FIG. 1. The wireless device 305 is a particular implementation of the wireless device 114 of FIG. 1.

The transfer button 306 may be an interface, switch, circuit, or software module that allows the user to send a signal or call transferring command to a class 5 switch, MSC, or other communications device for activating call transferring or placing a telephone call on hold. The transfer button 306 may be a graphical user interface, touch screen, voice command, scroll wheel, a sequence or simultaneous activation of keys or controls, or other input device that generates the command signal to implement call transferring when pressed, selected, or otherwise activated. The transfer button 306 may implement a feature within the standard telephone 302, cordless telephone 304, or the wireless device 305. Alternatively, the transfer button 306 may send a signal to an externally-connected device, such as a class 5 switch, local exchange, MSC, or server to activate the call transfer feature.

The standard telephone 302 and cordless telephone 304 are telephones that operate in conjunction with a publicly-switched network and class 5 switch. In another embodiment, the communications service accessible from the standard telephone 302 and the cordless telephone 304 may be part of a VoIP telephone service. The standard telephone 302 and cordless telephone 304 are provided dial tone through a wired connection to a home, business or other location in which the standard telephone 302 and cordless telephone 304 are located. The wireless device 305 may work in connection with one or more wireless networks.

Figure 4:
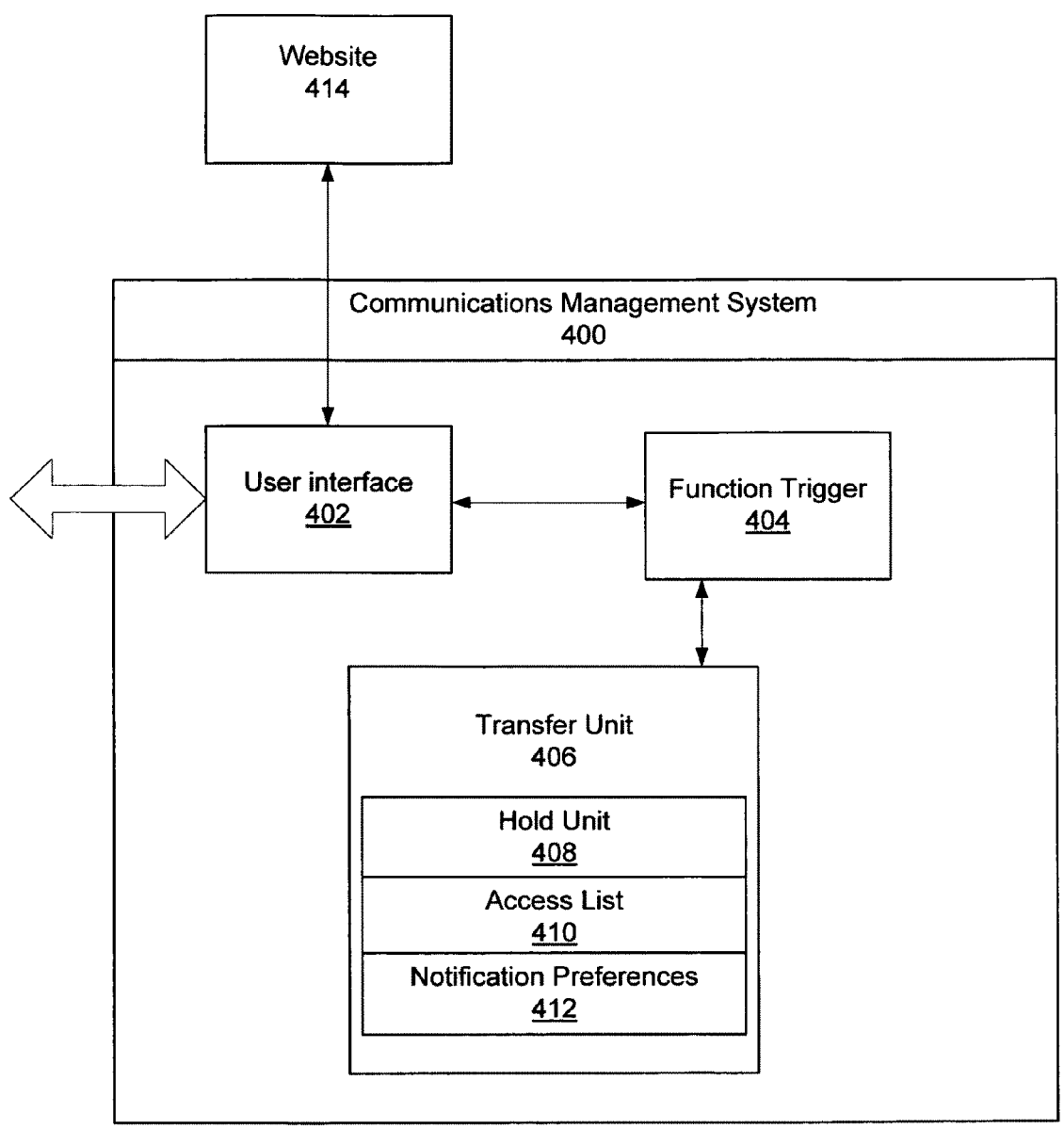
FIG. 4 is a block diagram of a communications management system in accordance with an illustrative embodiment.

FIG. 4 is a block diagram of a communications management system in accordance with an illustrative embodiment. The communications management system 400 may be a particular implementation of the communications management system 202 of FIG. 2. The communications management system 400 may include various elements including a user interface 402, function trigger 404, transfer unit 406 which may include a hold unit 408, access list 410, and notification preferences 412. The communications management system 400 may provide or receive communications from a website 414. The communications management system 400 may be a server or other computing element. The elements of the communications management system 400 may be implemented using hardware elements or in software. In one embodiment, the elements of the communications management system 400 are software modules, classes, or instructions.

The user interface 402 is an interface with the website 414 and/or one or more externally communicating users, applications, or communications devices or connections. In one embodiment, the user interface 402 may provide the website 414 for sending and receiving input from the user. The user interface 402 may receive a transfer command to implement the call transfer feature herein described. For example, the user interface 402 may receive a voice command to "Transfer the call to group 1" which may be a number of telephones specified by the access list 410.

The function trigger 404 is a trigger that implements configuration of the transfer unit 406 or implementation of the call transfer feature based on input received through the user interface 402. In on embodiment, the function trigger 404 may command the transfer unit 406 to activate the transfer unit 406.

The transfer unit 406 implements the call transfer using the hold unit 408, access list 410, and the notification preferences 412. The hold unit 408 may place the call on hold or transfer the call to a circuit or state to be held temporarily. The access list 410 specifies one or more groups of telephones to be rung when the call transfer command is received from a user. The access list may include any number of phone groupings each of which may list one or more identifiers associated with the telephone. Once the call or voice conversation is answered by the user utilizing one of the phones listed in the access list 410 a conversation may be continued as if the transfer between phones never occurred.

The transfer unit 406 sends control or connection signals through any number of communications devices indicating the voice communication is incoming. In response to the user answering one of the telephones, the ringing of the other telephones is terminated and the call is connected to the telephone selected by the user.

The notification preferences 412 specify user preferences for transferring the phone call to the phones on the access list 410. In one embodiment, the notification preferences may specify a delay or time period between the time the hold unit 408 holds the call and the telephones in the access list 410 are rang by the transfer unit. The notification preferences 412 may also specify a number of times that the phones in the access list 410 before the attempted connection or ringing is terminated and then the phones are rerang. For example, the notification preferences 412 may specify that the transfer unit 406 is to only ring the phones three times before terminating the connection and reattempting to connect to the telephones to prevent the call from being connected to an answering or voicemail service of any of the telephones. The number of rings attempted by the transfer unit 406 may be specified in the notification preferences 412. The notification preferences 412 may also specify whether and how the call may be connected to a voicemail or answering machine in the event the user does not answer any of the phones.

In another embodiment, the notification preferences 412 or access list 410 may specify a sequence in which the phones are individually called. For example, the transfer unit 406 may first ring a work telephone for three rings, followed by a home telephone for four rings, and then finally a wireless phone will ring until answered by the user or a voicemail service.

The notification preferences 412 may also specify that a message is to be sent to one or more recipients in response to receiving the transfer command. The message may be an email, text message, voice message, chat message, or other form of communication. In particular, the message may inform one or more individuals that may have access to the phones included in the access list 410 to answer or refrain from answering the phones in order to provide the user the opportunity to answer the phone and be connected to the call The message may also provide information regarding the caller or person who is receiving the call. This information may be used by any number of individuals to determine who should answer the phone and when. The message may include instructions and background information regarding the call so another party is not completely unaware of why the caller is calling.

The communications management system 400 may include any number of computing elements that are not explicitly called out including a processor, memory, bus, transceivers, interfaces, and other hardware and software components. The processor may be a computer processor or other processing or communications device or element used by the communications management system 400 to execute instructions, modules, logic, or otherwise process data.

The memory may be a static or dynamic storage medium, such as static random access memory, flash memory, or dynamic random access memory. However, the memory may be a hard disk read-only memory, or other suitable form or combination of volatile or nonvolatile memory. The memory may store user preferences, data, information, applications, and instructions for execution by the processor to implement the call transfer functions of the wireless management system.

Figure 5:
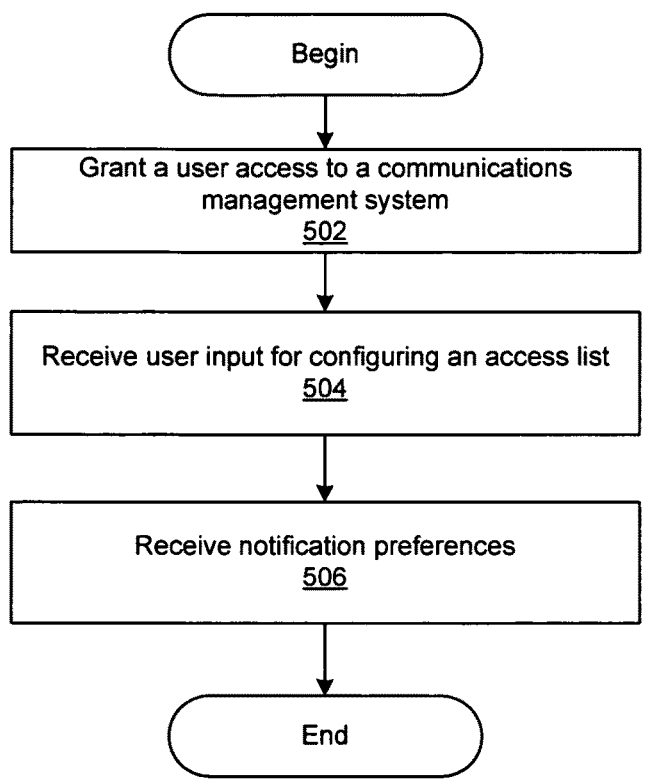
FIG. 5 is a flowchart of a process for establishing an access list in accordance with an illustrative embodiment.

FIG. 5 is a flowchart of a process for establishing an access list in accordance with an illustrative embodiment. The process of FIG. 5 may be implemented by a communications device, such as an MSC, local exchange, class 5 switch, or other network component.

The process may begin by granting a user access to a communications management system (step 502). The communications management system may be accessed using a remote client, graphical user interface, website, or other interface element. The user may access the communications management system through any type of network connection. In one embodiment, the user may be required to provide a username, password, account number, or other identification information in order to access the communications management system. For example, the user may utilize a personal cellular phone to access the communications management system.

Next, the communications device receives user input for configuring an access list (step 504). The user input may specify which group of phones are to be rung based on a user command to hold a phone call and re-ring other telephonic devices. The user input may also specify the command, shortcut key, voice command, or other information used to implement the transfer feature.

Next, the communications device receives notification preferences (step 506). The notification preferences specify how and when the call transfer feature is initiated and implemented. The notification preferences may specify a time delay from the time a command is entered to hold a call until the time a number of telephones are rung with the same call, such as 30 seconds. The notification preferences may also specify that each of the telephones are to ring three times and then the call connection is momentarily terminated and reattempted so that answering machines or voicemail applications of the different telephones do not connect to the call.

Figure 6:
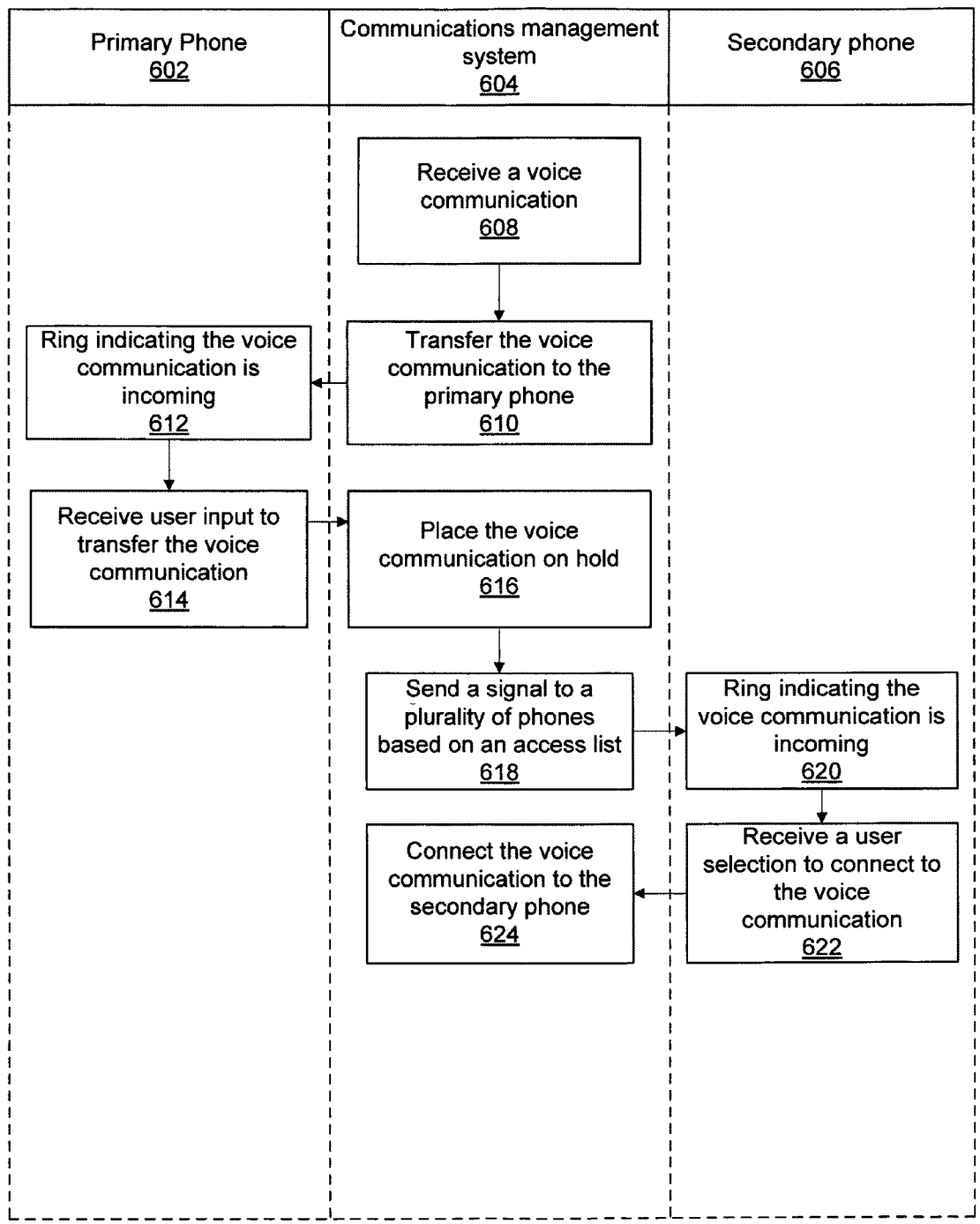
FIG. 6 is a flowchart of a process for transferring calls in accordance with an illustrative embodiment.

FIG. 6 is a flowchart of a process for transferring calls in accordance with an illustrative embodiment. The process of FIG. 6 may be implemented by a primary phone 602, communications management system 604, and a secondary phone 606. The process may begin with the communications management system 604 receiving a voice communication (step 608). The voice communication may be received through a POTS, digital or VoIP service, or wireless service. The communication management system 604 may be a device used to implement any one of the aforementioned services.

The communications management system 604 transfers the voice communication to the primary phone (step 610). In essence, during step 610, a call is being connected or completed to the user. The primary phone 602 rings indicating the voice communication is incoming (step 612). The user may answer the voice communication based on the ring which may be a sound, vibration, or other alert.

Next, the primary phone 602 receives user input to transfer the voice communication (step 614). In one embodiment, the user input may be a key sequence or selection of a specialized indicator, such as a button or designated portion of a touch screen. By providing a single sequence or user input, the user may elect to hold the call and ring multiple devices. The communications management system 604 then places the voice communication on hold (step 616). The communications management system 604 may play a pre-programmed message or content to the user during the time the call is placed on hold. For example, the user may be playing music, a news report, or other content.

The communications management system 604 then sends a signal to multiple phones based on an access list (step 618). The access list identifies that a number of phones are to ring indicating the voice communication is available or incoming. The multiple phones include the secondary phone 606. The secondary phone rings indicating the voice communication is incoming (step 620).

Next, the secondary phone receives a user selection to connect to the voice communication (step 622). In one embodiment, the user may answer the phone on which he or she desires to continue the voice communication. For example, the user may have transferred the phone call from a home telephone as the primary phone 602 to a wireless device as the secondary phone 606 in order to travel to the airport. The communications management system 604 connects the voice communication to the secondary phone (step 624). The voice communication is connected in response to the user selection in step 622.

FIG. 7 is a pictorial representation of a graphical user interface in accordance with an illustrative embodiment. The graphical user interface 700 may be used to display and manage an access list and notification preferences associated with a call transfer feature. In one embodiment, the graphical user interface 700 may be part of a web browsing application with content populated by a communications service provider, such as website 414 of FIG. 4. The graphical user interface 700 may also be part of an interactive message, such as an email message, SMS message, printout, or information otherwise electronically available to the user. The graphical user interface 700 may include a username 702, a password 704, a customer code 706, an edit access list indicator 708, a command code 710, notification preferences 712, a category 714, a number 716, and a name 718. The interface elements of the graphical user interface 700 may be a button, icon, toggle, or other graphical interface for receiving a selection or user input from a user.

In one embodiment, the graphical user interface 700 may be displayed to the user only if the user has signed up for a call transfer feature. Alternatively, the graphical user interface 700 may be printed in the form of an access list that may be sent to the user monthly with other invoice information. The graphical user interface 700 may also be integrated in an email that is sent to the user at the end of a billing cycle.

The user name 702, password 704 and customer code 706 may be used by a website or authentication system to determine whether a user may access the graphical user interface 700. The customer code 706 may be the code provided to bill calls and access the account. In one embodiment, the user name 702 and password 704 may be used to establish a secure connection between a client device of the user and the billing system. The secure connection may be a virtual private network tunnel, an encrypted connection, firewall, or other form of secured communication link suitable for secure data exchange. The user name 702 and password 704 may be verified by an authentication device or module of the communication system.

The edit access list indicator 708 may allow a user to select to add more telephones or numbers to the access list. The user may select from a pre-defined set of numbers that may be retrieved from caller identification information or the numbers may be entered by the user. The numbers may be displayed in a drop-down list or other format. The command code 710 is the code or user input that implements the call transfer to ring a number of telephones. The command code 710 may be set by the user or it may have a default value. In one embodiment, a user may set a number of command codes for different access lists.

The notification preferences 712 include the additional user preferences for implementing the call transfer feature. In one embodiment, the user may specify a time delay after entering the command code 710 before the multiple devices ring. In another embodiment, the user may specify a number of rings before the call is terminated and a second call is made in order to avoid the call being transferred to voicemail or connected to an answering machine.

The notification preferences 712 may allow a user to send an email or text message to any number of devices. The email or text message may provide a warning that a call is going to be transferred in the event the user needs another person to answer one of the devices listed on the access list. Additionally, the email or text message may inform a user that the call is intended for the user and is not to be answered by any other individuals that may have access to the phones or shared lines associated with the phones. The email or text message address or number may be specified in the notification preferences 712.

The notification preferences 712 may also allow an incremental transfer in which each of the phone numbers or devices listed on the access list is rung a pre-set number of times before ringing the next device. The notification preferences 712 may allow a user to specify the order or priority in which the devices are rung.

The category 714, number 716, and name 718 provide information regarding the access list. In particular, the category 714 may allow the user to specify which type of device is called. The number 716 may be an identifier for calling or connecting to the device. The number 716 may include a phone number, user name, chat identification, Internet Protocol address, or other information for dialing or communicating with a specified device. The name 718 may allow a user to specify a name, nickname, or other textual identifier for the number called. The information provided in the category 714, number 716, and name 718 may allow a user to customize the access list and more easily recognize which numbers, phones, individuals may be involved when the command code 710 is asserted.

The previous detailed description is of a small number of embodiments for implementing the invention and is not intended to be limiting in scope. The following claims set forth a number of the embodiments of the invention disclosed with greater particularity.

What is claimed:

1. A method for transferring calls, the method comprising:
   receiving notification preferences;
   receiving a plurality of access lists and a plurality of command codes wherein one command code is associated with each access list;
   receiving a voice communication;
   placing the voice communication on hold in response to user input of a selected command code;
   ringing a plurality of phones associated with the access list associated with the selected command code simultaneously; and
   connecting the voice communication to one of the plurality of phones in response to a user answering the voice communication on the one of the plurality of phones.

2. The method according to claim 1, wherein the plurality of command codes comprise distinct key sequences.

3. The method according to claim 1, wherein the plurality of phones are phone numbers associated with voice communication devices or voice communication services.

4. The method according to claim 1 wherein the plurality of access lists are pre-set by the user.

5. The method according to claim 1, wherein the notification preferences set a sequence in which the plurality of phones are individually called.

6. The method according to claim 4, wherein the access lists and command codes are specified by the user utilizing a graphical user interface.

7. The method according to claim 1, further comprising:
   automatically sending a message to one or more recipients in response to the holding.

8. The method according to claim 1, wherein the ringing further comprises:
   delaying a time period before ringing the plurality of phones simultaneously, wherein the timer period is established by the user.

9. The method according to claim 1, wherein the ringing further comprises:

ringing the plurality of phones simultaneously a number of times;

canceling the ringing once the phones ring the number of times for preventing a answering service from connecting to the voice communication;

re-ringing the plurality of phones simultaneously the number of times until one of the plurality of phones is answered in response to the canceling the ringing.

10. The method according to claim 7, further comprising:
playing a pre-programmed message to a calling party in response to the holding.

11. The method according to claim 7, wherein the message indicates to the one or more recipients whether to answer or not answer the plurality of phones.

12. The method according to claim 7, wherein the message is an email or text message, and wherein the message indicates the voice communication is being transferred to the plurality of phones.

13. A communication system, the system comprising:
a switch configured to receive a voice communication, wherein the switch further includes:
a transfer unit configured to;
receive notification preferences;
receive a plurality of access lists and a plurality of command codes wherein one command code is associated with each access list;
receive a voice communication;
place the voice communication on hold in response to user input of a selected command code;
ring a plurality of phones associated with the access list associated with the selected command code simultaneously; and
connect the voice communication to one of the plurality of phones in response to a user answering the voice communication on the one of the plurality of phones.

14. The communication system according to claim 13, further comprising:
a user interface for receiving the access lists and the notification preferences from the user, wherein the notification preferences specify a delay before the plurality of phones are rang.

15. The communication system according to claim 13, wherein the transfer unit rings the plurality of phones simultaneously a number of times, cancels the ringing once the phones ring the number of times for preventing a answering service from connecting to the voice communication, and re-rings the plurality of phones simultaneously in response to the canceling the ringing and according to the notification preferences.

16. The communication system according to claim 14, wherein the notification preferences specify an order for ringing the plurality of phones and a message that is sent to one or more recipients in response to placing the voice communication on hold.

17. A call transfer system comprising:
a processor for executing a set of instructions; and
a memory for storing the set of instructions, wherein the set of instructions are configured to
receive notification preferences
receive a plurality of access lists and a plurality of command codes wherein one command code is associated with each access list;
receive a voice communication,
placing the voice communication on hold in response to user input of a selected command code;
ring the plurality of phones associated with the access list associated with the selected command code simultaneously; and
connect the voice communication to one of the plurality of phones in response to a user answering the voice communication on the one of the plurality of phones.

18. The call transfer system according to claim 17, wherein the set of instructions delay ringing the plurality of phones for a time period specified by the user.

19. The call transfer system according to claim 17, wherein the plurality of phones are rang one at a time for a specified number of rings in an order specified by the user to prevent an answering system from connection to the voice communication.

20. The call transfer system according to claim 17, wherein the set of instructions ring the plurality of phones simultaneously a number of times, cancels the ringing once the phones ring the number of times for preventing a answering service from connecting to the voice communication, and re-rings the plurality of phones simultaneously in response to the canceling the ringing and according to the notification preferences.

* * * * *